(12) United States Patent
Araki et al.

(10) Patent No.: US 6,662,766 B2
(45) Date of Patent: Dec. 16, 2003

(54) TWO-STROKE INTERNAL COMBUSTION ENGINE

(75) Inventors: Tsuneo Araki, Tokyo (JP); Yumin Liu, Tokyo (JP)

(73) Assignee: Kioritz Corporation, Tokyo (JP)

( * ) Notice: Subject to any disclaimer, the term of this patent is extended or adjusted under 35 U.S.C. 154(b) by 128 days.

(21) Appl. No.: 10/173,094

(22) Filed: Oct. 19, 2001

(65) Prior Publication Data

US 2003/0075123 A1 Apr. 24, 2003

(30) Foreign Application Priority Data

Oct. 19, 2000 (JP) ........................................ 2000-318841

(51) Int. Cl.$^7$ ............................................... F02B 33/04
(52) U.S. Cl. ................................ 123/73 PP; 123/65 A; 123/73 A
(58) Field of Search ........................... 123/65 A, 65 P, 123/65 V, 73 R, 73 A, 73 PP, 73 V

(56) References Cited

U.S. PATENT DOCUMENTS

| | | | |
|---|---|---|---|
| 5,490,483 A | | 2/1996 | Tanikake et al. ............... 123/65 |
| 6,216,650 B1 | * | 4/2001 | Noguchi .................... 123/73 A |
| 6,240,886 B1 | * | 6/2001 | Noguchi ................. 123/73 AA |
| 6,257,179 B1 | * | 7/2001 | Uenoyama et al. ....... 123/65 R |
| 6,289,856 B1 | * | 9/2001 | Noguchi ................. 123/73 PP |
| 6,298,811 B1 | * | 10/2001 | Sawada et al. ............ 123/73 A |

OTHER PUBLICATIONS

JP Laid Open Patent Publication [Kokai] No. 5–33657 (33657/93 A), Nakachi Masaaki, "Two–Cycle Engine," with English–language abstract, filed Jul. 31, 1991, published Feb. 9, 1993.
JP Laid Open Patent Publication [Kokai] No. 9–125996 (125996/97 A), Kuroda Koji and Sato Osamu, "Variable Cylinder Device of Internal Combustion Engine," with English–language abstract, filed Nov. 6, 1995, published May 13, 1997.
JP Laid Open Patent Publication [Kokai] No. 2000–136725 (136725/00 A), Sawada Toshiharu, Kato Hiroshi and Watanabe Takeshi, "Cylinder for Layered Scavenged Two–Cycle Engine," English–language abstract, filed Oct. 30, 1998, published May 16, 2000.

* cited by examiner

*Primary Examiner*—Noah P. Kamen
(74) *Attorney, Agent, or Firm*—Baker Botts L.L.P.

(57) ABSTRACT

An air-preintroduction type two-stroke internal combustion engine which is capable of minimizing the quantity of blow-by, thus making it possible to improve the fuel consumption and to reduce the content of poisonous components in the exhaust gas, and is also capable of reasonably and compactly arranging the peripheral components of engine, thereby making it possible to reduce the number of parts, to lighten the weight thereof, to save the manufacturing cost thereof, and to simplify the working and assembling thereof. Specifically, this internal combustion engine is characterized in that an air inlet passageway for introducing air into the scavenging passageways is provided inside a wall portion of the cylinder.

15 Claims, 7 Drawing Sheets

TWO-STROKE INTERNAL COMBUSTION ENGINE

CROSS-REFERENCE TO RELATED APPLICATION

This application claims the priority of Japanese Patent Application No. 2000-318841, filed Oct. 19, 2000.

BACKGROUND OF THE INVENTION

1. Field of the Invention

The present invention relates to two-stroke internal combustion engines which are suited for use in portable power working machines, and in particular to two-stroke internal combustion engines which are designed to introduce air into a combustion actuating chamber prior to the introduction of air-fuel mixture, thereby making it possible to minimize the quantity of air-fuel mixture discharged from the combustion actuating chamber without being utilized for the combustion.

2. Background of Related Art

An ordinary small air-cooled two-stroke internal combustion engine that is conventionally used in portable power machines, such as chain saws or bush cutters, is constructed such that an ignition plug is disposed at the head portion of the cylinder, and an intake port, scavenging ports and an exhaust port are provided at the trunk portion of the cylinder. The intake port, the scavenging ports, and the exhaust port are opened and closed by a piston. According to this type of two-stroke internal combustion engine, one cycle of the engine is accomplished by two strokes of the piston, without undergoing a stroke which is exclusively assigned to the intake or the exhaust.

More specifically, during the ascending stroke of the piston, an air-fuel mixture is introduced from the intake port into the crankcase disposed below the piston. During the descending stroke of the piston, the air-fuel mixture is pre-compressed to produce a compressed gas mixture. This compressed gas mixture is then blown into a combustion actuating chamber disposed above the piston, thereby enabling waste combustion gas in the combustion actuating chamber to be discharged through the exhaust port. Since the scavenging of the waste combustion gas is effected by making use of the gas flow of the air-fuel mixture into the combustion actuating chamber, the unburnt air-fuel mixture is likely to be mingled with the waste combustion gas (i.e., exhaust gas), thereby increasing the quantity of air-fuel mixture to be discharged into the atmosphere without being utilized for combustion, this unburnt air-fuel mixture referred to herein as "blow-by." Because of this aspect of combustion, the two-stroke internal combustion engine is not only inferior in fuel consumption as compared with a four-stroke internal combustion engine, but this engine is also disadvantageous in that a greater quantity of poisonous components such as HC (unburnt components in a fuel) and CO (incomplete combustion components in a fuel) may be included in the exhaust gas, as compared with the four-stroke engine. Therefore, even if the two-stroke engine is small in capacity, the effect of these poisonous components on environmental contamination may not be disregarded.

With a view to address these disadvantages of ordinary air-cooled two-stroke internal combustion engine, various kinds of "air-preintroduction" type two-stroke internal combustion engine have been proposed. Air-preintroduction type two-stroke internal combustion engines typically have an air inlet passageway for introducing external air attached to a scavenging passageway, thereby permitting air to be introduced into the combustion actuating chamber in the descending stroke of the piston, prior to the introduction of the air-fuel mixture. The air that is pre-introduced into the combustion actuation chamber forms a layer between the waste combustion gas to be discharged and the unburnt air-fuel mixture being introduced. This air layer is intended to prevent the unburnt air-fuel mixture from being mixed with the waste combustion gas, thus minimizing the quantity of blow-by. (For example, see Japanese Patent Unexamined Publications H9-125966 and H5-33657, and Japanese Patent No. 3040758).

However, these conventional air-preintroduction type two-stroke internal combustion engines include peripheral structure, such as air inlet passageways (e.g., one or more pairs of right and left scavenging passageways may be used, if the air inlet passageway is bifurcated), which are required to be separately installed outside the engine body (i.e., cylinder body and crankcase) in order introduce air into the scavenging passageway, etc. These conventional air-preintroduction type two-stroke engines have the disadvantage that this peripheral structure around the engine body, including the air-introducing passageways, becomes complicated, larger in size as a whole, and heavier in weight. In addition, the operation and assembly of this type of engine are rather troublesome, thus requiring further improvements to make it suitable for use in a portable power working machine.

Accordingly, there exists a need in the art for a two-stroke internal combustion engine which can overcome the aforementioned disadvantages associated with the conventional air-preintroduction type two-stroke internal combustion engine.

SUMMARY OF THE INVENTION

An object of the present invention is to provide an air-preintroduction type two-stroke internal combustion engine which is capable of reasonably and compactly arranging the peripheral components of engine, thereby making it possible to reduce the number of parts, to lighten the weight thereof, to save the manufacturing cost thereof, and to simplify the working and assembling thereof.

These and other objects of the invention, which will become apparent with reference to the disclosure herein, are accomplished by the two-stroke internal combustion engine according to the present invention, which comprises a cylinder body in which a piston is adapted to be fittingly inserted; a crankcase disposed below the cylinder body and defining a crank chamber; and means for forming an air-fuel mixture; and one or more pairs of Schnürle-type scavenging passages, each allowing the combustion actuating chamber disposed above the piston to be communicated with the crankcase. The scavenging passages may be symmetrically provided on both sides of the longitudinal section which divides an exhaust port provided on a sidewall of the cylinder into two equal parts, thereby allowing air to be introduced into the scavenging passages. The air-fuel mixture may be introduced into the combustion actuation chamber from the crank chamber. During a descending stroke of the piston, the exhaust port is first opened before a scavenging port formed at a downstream end of the scavenging passageway is opened, thereby enabling air to be introduced via the scavenging passageway into the combustion actuating chamber prior to the introduction of the air-fuel mixture.

This two-stroke internal combustion engine according to the present invention is also characterized in that an air inlet passageway for introducing air into the scavenging passageways is provided inside the wall portion of the cylinder.

In a preferred embodiment, the air inlet passageway is constituted by an air inlet port, a pair of right and left linear branch passageways communicated with the air inlet port, and a communicating passageway which permits the branch passageways to be communicated with the scavenging passageway.

This communicating passageway should preferably be formed with a cap member to be attached to the cylinder.

In a preferred embodiment, the air inlet passageway is provided with a check valve. Further, a check valve may be attached to the cap member or to the branch passageways.

In further preferred embodiment, the internal combustion engine is further provided with an air-feeding passageway for feeding external air to the air inlet passageway, and with an air-fuel mixture-feeding passageway for feeding, via an air-fuel mixture-inlet port, air-fuel mixture generated by the air-fuel mixture generating means to the crank chamber, the air-feeding passageway and the air-fuel mixture-feeding passageway being arranged side by side.

In further preferred embodiment, the air-fuel mixture-inlet port to be opened and closed is disposed below the air inlet port formed in the cylinder.

In a more preferred embodiment, the crankcase is provided with the air inlet port and the air-fuel mixture-inlet port.

In another preferred embodiment, the air-fuel-generating means is a carburetor which is provided with the air-feeding passageway and the air-fuel mixture-feeding passageway, each provided with a throttle valve, and these throttle valves being interlocked with each other.

According to the preferable embodiments of two-stroke internal combustion engine of the present invention as described above, the external air is sucked via the air-feeding passageway into the air inlet port and the air inlet passageway, and at the same time, this external air is also introduced via this air inlet passageway and an air-check valve, such as a reed valve, into the scavenging passageways as well as into the crank chamber so as to be reserved therein in the ascending stroke of the piston. The air-fuel mixture supplied from the air-fuel mixture-generating means is sucked, via the air-fuel mixture-feeding passageway and the air-air-fuel mixture inlet port, into the crank chamber so as to be reserved therein.

When an air-fuel mixture inside the combustion actuating chamber disposed above the piston is exploded and burnt through the ignition thereof, the piston is caused to be pushed downward due to the generation of combustion gas. In the descending stroke of the piston, the air and the air-fuel mixture existing in the air inlet passageway, the scavenging passageways and the crank chamber are compressed by the piston, and at the same time, an exhaust port is opened first. When the piston descends further, the scavenging port provided at a downstream end of each of the scavenging passageways is subsequently opened. During this scavenging period, only the air which has been existed in the scavenging passageways and the air inlet passageway and compressed by the piston is permitted to be introduced from the scavenging ports into the combustion actuating chamber.

When the piston has descended further, the introduction of air from the scavenging ports to the combustion actuating chamber is completed, after which the air-fuel mixture that has been precompressed in the crank chamber is introduced via the scavenging passageways into the combustion actuating chamber until the scavenging period is completed.

Accordingly, since air is introduced into the combustion actuating chamber from the scavenging ports prior to the introduction of an air-fuel mixture during the descending stroke of the piston, the waste combustion gas is forced, by this action of air, to be pushed out of the exhaust port and then, discharged via a muffler into the external atmosphere without leaving a residue of waste combustion gas not only in the combustion actuating chamber but also in a portion near the inner wall of cylinder which is disposed opposite to the exhaust port.

In this case, a layer of the air that has been introduced in advance from the scavenging ports into the combustion actuating chamber is formed at an interface between the waste combustion gas and the air-fuel mixture that is introduced later from the scavenging ports into the combustion actuating chamber. Due to the existence of this air layer, the air-fuel mixture is effectively prevented from being mixed with the waste combustion gas, thereby realizing a stratified scavenging. As a result, the quantity of so-called blow-by, i.e., the quantity of air-fuel mixture to be discharged without being utilized for the combustion, can be reduced to a minimum, thus making it possible to reliably and completely ignite the air-fuel mixture, to improve the fuel consumption, and to reduce the content of poisonous components in the exhaust gas.

Further, according to the two-stroke internal combustion engine of the present invention, an air inlet passageway is provided inside the wall portion of the cylinder. Therefore, in contrast to the conventional internal combustion engine where bifurcated air inlet passageways are required to be separately installed outside the engine body (i.e., cylinder body and crankcase), it becomes possible according to this invention to reasonably and compactly arrange the peripheral components of engine, thereby making it possible to reduce the number of parts, to lighten the weight thereof, to save the manufacturing cost thereof, and to simplify the working and assembling thereof.

In this case, when a pair of the right and left branch passageways constituting a main portion of the air inlet passageway are made linear in configuration, these branch passageways can be formed by means of not only draw-molding but also drilling work, thereby making it possible to greatly improving the productivity.

Further, since the air inlet passageway is formed inside the wall portion of cylinder, the effective length of the air inlet passageway can be shortened as compared with the conventional air inlet passageway, and hence it is expected that the performance of engine such as response characteristics can be improved.

In accordance with the invention, the objects as described above have been met, and the need in the art for an engine that efficiently ignites the air-fuel mixture with a minimum of blow-by, that improves fuel consumption and reduces the content of poisonous gases, and that has a compact configuration, has been satisfied. Further features of the invention, its nature and various advantages will be more apparent from the accompanying drawings and the following detailed description of illustrative embodiments.

DETAILED DESCRIPTION OF THE EXEMPLARY EMBODIMENTS

The present invention will be further explained with reference to the drawings depicting embodiments of the two-stroke internal combustion engine according to the present invention.

Figure 1:
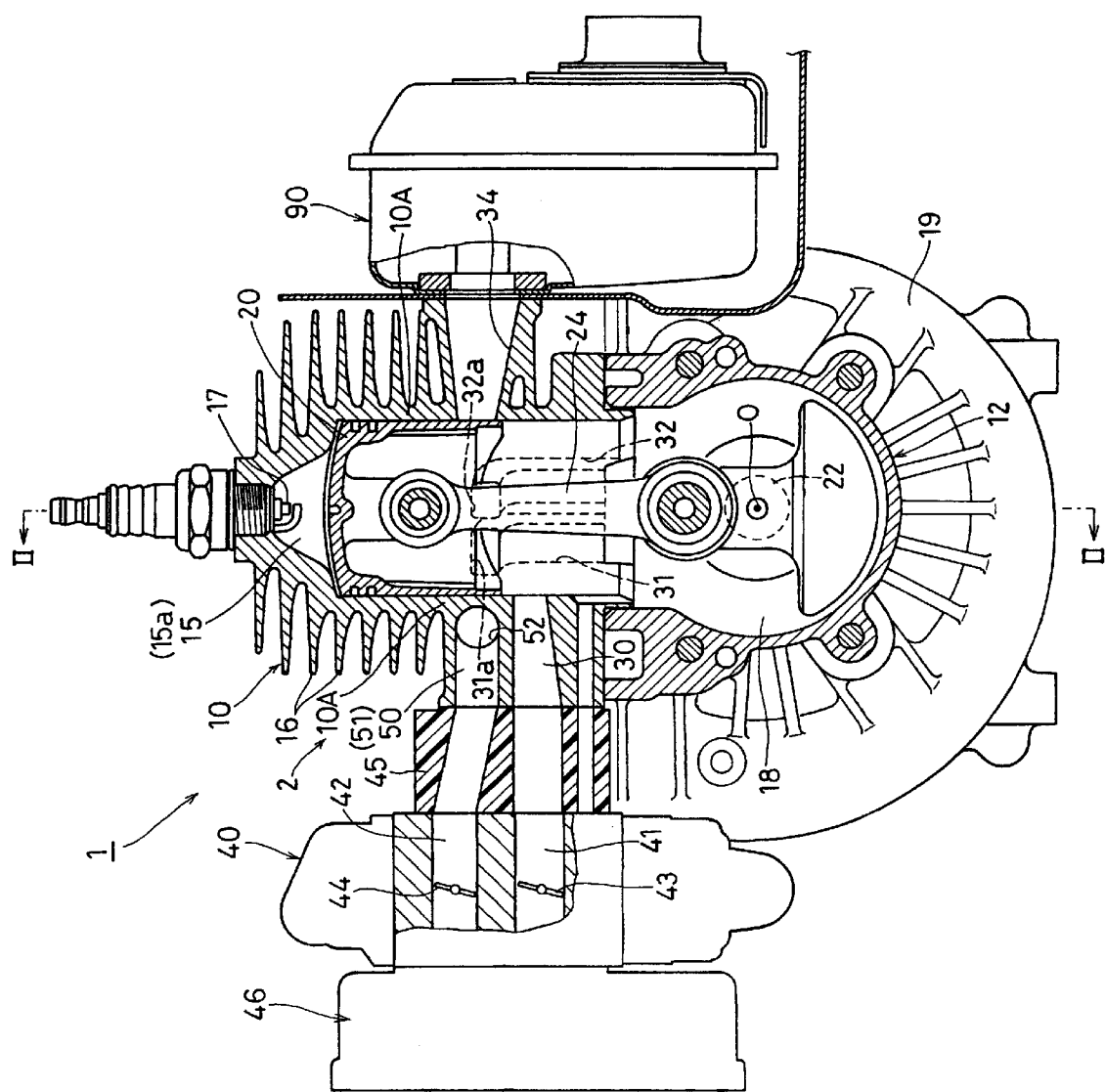
FIG. 1 is a longitudinal sectional view illustrating an embodiment of a two-stroke internal combustion engine in accordance with the present invention, wherein the piston is illustrated at the top dead center.
Figure 2:
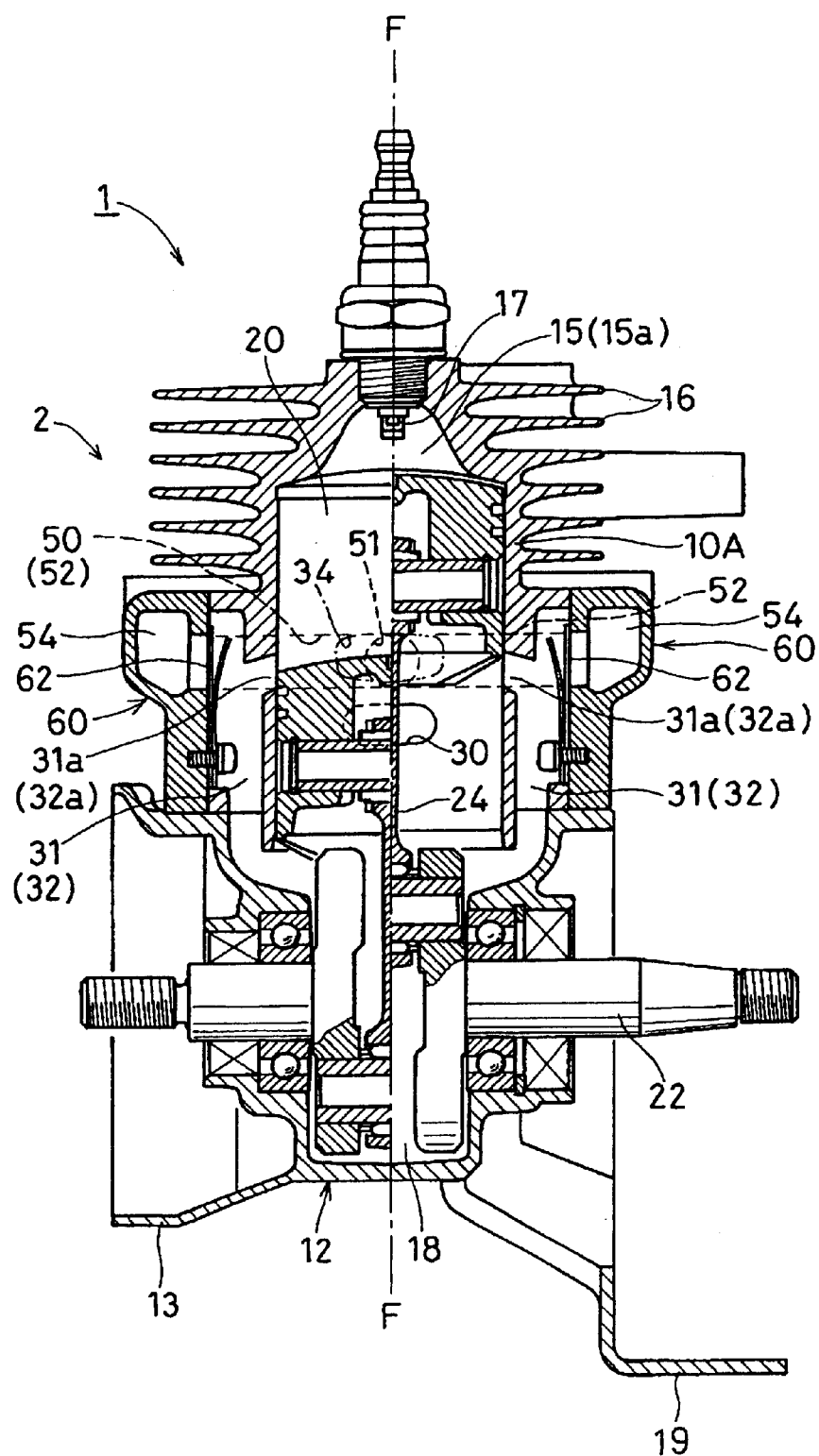
FIG. 2 is a cross-sectional view taken along the line II—II of FIG. 1, in accordance with the present invention.
Figure 3:
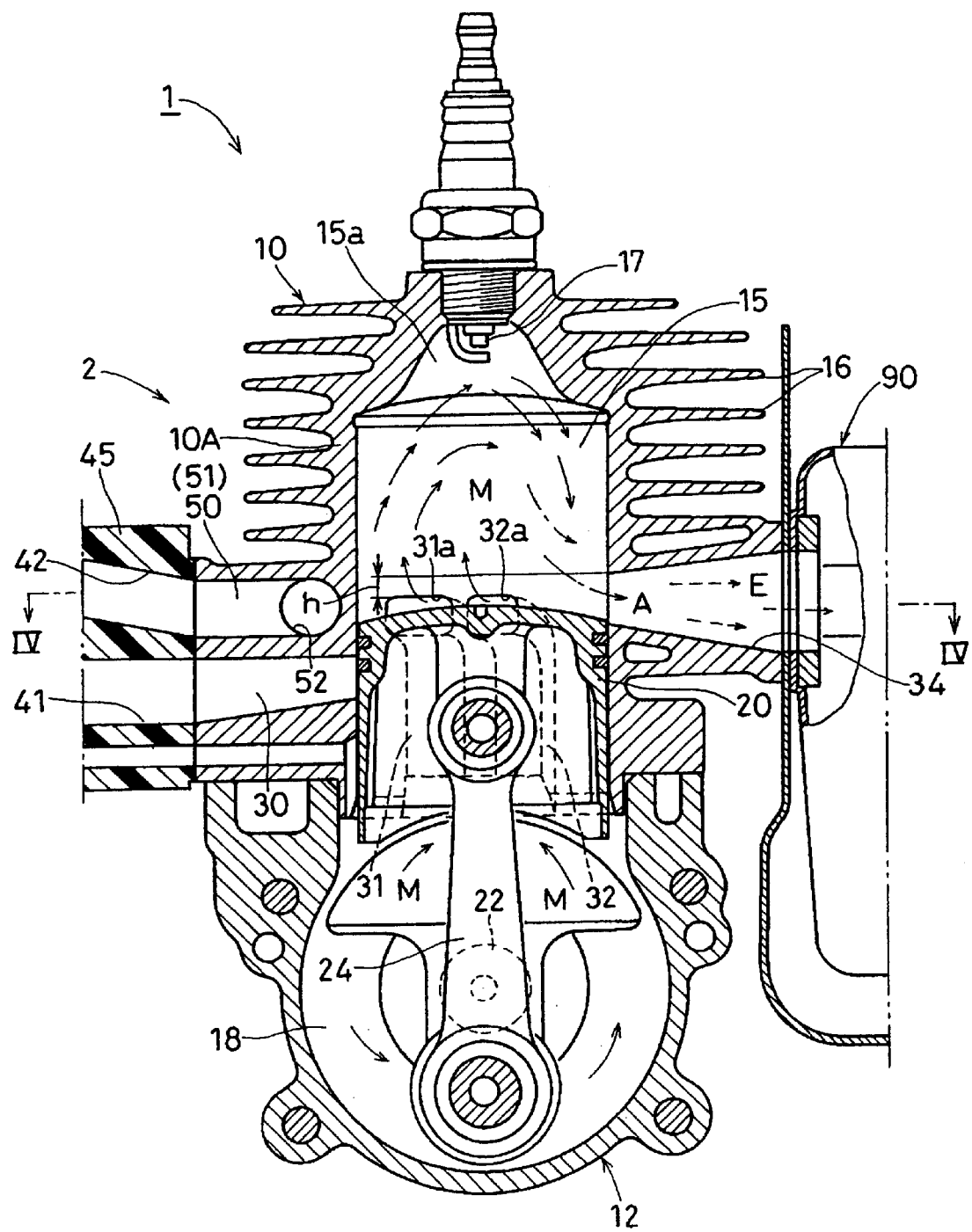
FIG. 3 corresponds to FIG. 1, and illustrates an enlarged longitudinal sectional view of the engine in accordance with the present invention, wherein the piston is illustrated at the bottom dead center.
Figure 4:
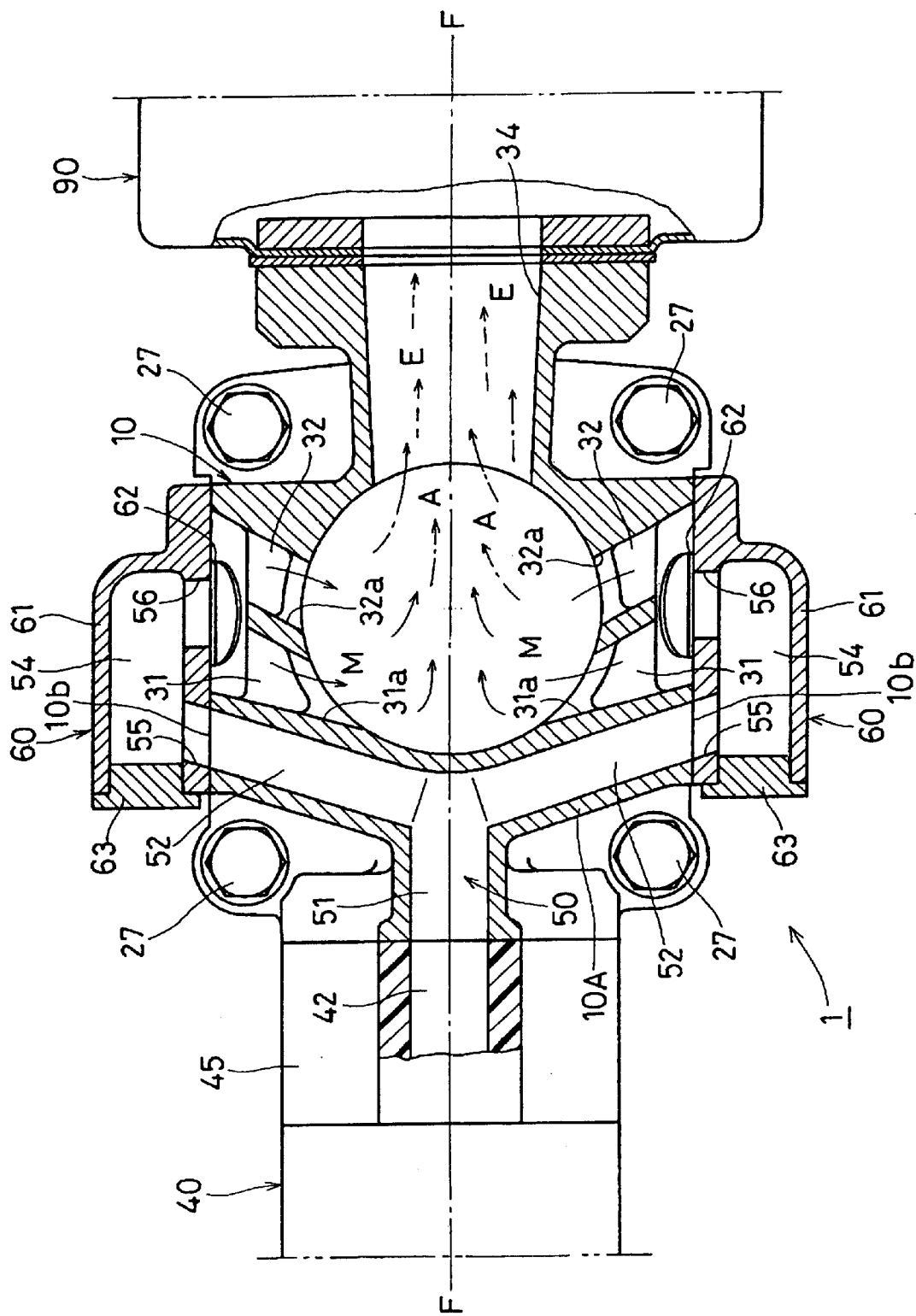
FIG. 4 is a cross-sectional view taken along the line IV—IV of FIG. 3, in accordance with the present invention.

FIG. 1 is a longitudinal sectional view illustrating one embodiment of a two-stroke internal combustion engine according to the present invention, wherein the piston is positioned at the top dead center; FIG. 2 is a cross-sectional view taken along the line II—II of FIG. 1; FIG. 3 corresponds to FIG. 1, and illustrates an enlarged longitudinal sectional view of the engine, wherein the piston is positioned at the bottom dead center; and FIG. 4 is a cross-sectional view taken along the line IV—IV in FIG. 3.

For convenience of explanation, the left side of the line F—F in FIG. 2 illustrates a longitudinal sectional view sectioning a first scavenging port in which the piston is positioned at the bottom dead center, while the right side thereof illustrates a longitudinal sectional view sectioning a second scavenging port in which the piston is positioned at the top dead center.

Referring to FIGS. 1–4, the two-stroke internal combustion engine 1 may be a small air-cooled two-stroke gasoline engine of quaternary scavenging type, which is adapted to be employed in a portable powered working machine. This engine 1 comprises a cylinder body 10 which defines a cylindrical passage, or "cylinder," in which a piston 20 is fittingly inserted, and a crankcase 12 having a horizontal split structure. This crankcase 12 is disposed below the cylinder body 10 and may be hermetically fastened thereto by means of four through-bolts 27 which are inserted respectively at four corners of these components (see FIG. 4). The crankcase 12 defines a crank chamber 18 located below the cylinder body 10 and rotatably supports a crank shaft 22 which is designed to reciprocatively move the piston 20 up and down through a connecting rod 24. Thus, the main body 2 of engine is constituted by the cylinder body 10 and the crankcase 12.

On the right and left sides of the crankcase 12, a base portion 13 of the recoil starter case and a base portion 19 of the fan case may be integrally attached thereto (see FIG. 2).

The cylinder body 10 is provided, on the outer circumferential wall thereof, with a large number of cooling fins 16, and, at the head portion thereof, with a squish-dome shaped (i.e., semi-spherical) combustion chamber 15a constituting a portion of the combustion actuating chamber 15, also referred to as a combustion chamber, an actuating chamber, a cylinder chamber, etc. An ignition plug 17 protrudes into the combustion chamber 15a.

As illustrated in FIGS. 2 and 4, an exhaust port 34 is located to one side (i.e., the right side in FIG. 1) of trunk portion of the cylinder body 10. A pair of first scavenging passages 31 of Schnürle-type, as are known in the art, are located on a side away from the exhaust port 34. Another pair of second scavenging passages 32 of Schnürle-type are located on a side closer to the exhaust port 34. The pair of first scavenging passages 31 and the pair of second scavenging passage 32 are symmetrically provided on both sides of the longitudinal section F—F (FIG. 2) which divides the exhaust port 34 into two equal parts. Further, a pair of first scavenging ports 31a and another pair of second scavenging ports 32a, both opened to the combustion actuating chamber 15, are disposed at upper ends (downstream ends) of these first scavenging passages 31 and second scavenging passages 32.

In this embodiment, the top level of the first scavenging ports 31a is made identical with the top level of the second scavenging ports 32a, and these top levels are positioned lower than the top end of the exhaust port 34 by a distance of "h" (see FIG. 3). As a result, during the descending stroke of the piston 20, both of the first scavenging ports 31a and the second scavenging ports 32a are permitted to simultaneously open a moment later than the exhaust port 34. The outer peripheral sides of these first and second scavenging passages 31 and 32 are closed by a pair of right and left cap members 60 which are attached to the flat portions 10b which have been made flat by working the outer periphery of the wall 10A of cylinder body 10.

According to this embodiment, an air inlet passageway 50 for introducing air "A" into these first and second scavenging passages 31 and 32 is provided inside the wall portion 10A of the cylinder body 10, which is located opposite (the left side in FIG. 1) to the location where the exhaust port 34 is provided.

As illustrated in FIG. 4, this air inlet passageway 50 is constituted by an air inlet port 51 disposed near the central portion in the elevational direction of the cylinder body 10, a pair of right and left linear branch passageways 52 which are located on the both sides of the air inlet port 51 and intersected and communicated with each other at a predetermined angle, and a pair of right and left communicating passageways 54 for permitting the branch passageways 52 to be communicated with the first and second scavenging passages 31 and 32.

With continued reference to FIG. 4, these right and left communicating passageways 54 are formed with the cap members 60 which are attached to the cylinder body 10. These cap members 60 are respectively constituted by a passage-forming portion 61 having a U-shaped cross-section and a 9-shaped longitudinal section, and a blind cap member 63 for closing the opening side of the passage-forming portion 61. The passage-forming portion 61 is provided, on the branch passageways 52 side thereof, with an air inlet port 55, and on the scavenging passageways 31, 32 side thereof, with an air outlet port 56. Further, a stopper-attached air reed valve 62 to be functioned as an air check valve is attached to the scavenging passageways 31, 32 side of the air outlet port 56 for enabling the air outlet port 56 to be opened or closed.

An air-fuel mixture inlet port 30 to be opened or closed by means of the piston 20 is disposed below the air inlet port 51 of the cylinder body 10. (Inlet port 30 is opened in FIG. 1, and closed in FIG. 3, as determined by the position of piston 20.) A carburetor 40 functioning as an air-fuel mixture-forming means is attached, via a passage-built-in heat insulator 45, to the air inlet port 50 and the air-fuel mixture inlet port 30. An air cleaner 46 is mounted on the upstream side of the carburetor 40. Alternatively, the air-fuel mixture may be formed by other similar apparatus as is well-known in the art.

Air "A" and air-fuel mixture "M" are fed to the air inlet port 51 and the air-fuel mixture inlet port 30 through the air cleaner 46, the carburetor 40 and the heat insulator 45.

The carburetor 40 is provided with an air feeding passageway 42 for guiding the external air "A" that has been cleaned by the air cleaner 46 to the air inlet port 51, and with an air-fuel mixture feeding passageway 41 for guiding an air-fuel mixture "M" that has been produced in the carburetor 40 to the crank chamber 18 through the insulator 45 and the air-fuel mixture inlet port 30. As illustrated in FIGS. 1 and 3, the air feeding passageway 42 and the air-fuel mixture feeding passageway 41 are arranged side by side, and are provided with throttle valves 44 and 43, respectively, which are designed to be interlocked with each other through a link member (not shown).

According to the two-stroke internal combustion engine 1 of this embodiment which is constructed as described above, during this ascending stroke of the piston 20, the external air "A" is sucked up and introduced, through the air feeding passageway 42, the air inlet passageway 50 and the air reed valve 62, into the first and second scavenging passages 31 and 32, and also into the crank chamber 18, allowing the air to be stored therein. On the other hand, the air-fuel mixture "M" supplied from the carburetor 40 is sucked up and introduced, through the air-fuel mixture feeding passageway 41 and the air-fuel mixture inlet port 30, into the crank chamber 18, allowing the air-fuel mixture to be stored therein (see FIGS. 1 and 2).

When the air-fuel mixture "M" inside the combustion actuating chamber 15 disposed above the piston 20 is ignited and exploded, the piston 20 is pushed down due to the generation of a combustion gas. During this descending stroke of the piston 20, the air "A" and the air-fuel mixture "M" existing in the air inlet passageway 50, the scavenging passageways 31 and 32, and the crank chamber 18 are compressed by the piston 20, and at the same time, an exhaust port 34 is opened at first, and when the piston 20 is further descended, the first and second scavenging ports 31a and 32a provided at a downstream end of the scavenging passageways 31 and 32 are opened. During this scavenging period wherein the scavenging ports 31a and 32a are opened, only the air "A" which has been existed in the first and second scavenging passageways 31 and 32 and the air inlet passageway 50 and compressed by the piston 20 is permitted to be introduced via these scavenging ports 31a and 32a into the combustion actuating chamber 15.

When the piston 20 is further descended, the introduction of air "A" from the scavenging ports 31a and 32a to the combustion actuating chamber 15 is completed, after which, following the air "A", the air-fuel mixture "M" that has been precompressed in the crank chamber 18 is introduced via the first and second scavenging passageways 31 and 32 into the combustion actuating chamber 15 until the scavenging period is completed.

As described above, since air "A" is introduced into the combustion actuating chamber 15 from the scavenging ports 31a and 32b prior to the introduction of an air-fuel mixture "M" in the descending stroke of the piston 20, the waste combustion gas "E" is forced, by this action of air "A", to be pushed out of the exhaust port 34 and then, discharged via a muffler 90 into the external atmosphere without leaving a residue of waste combustion gas "E" not only in the combustion actuating chamber 15 but also in a portion near the inner wall of cylinder body 10 which is disposed opposite to the exhaust port 34.

In this case, a layer of the air "A" that has been introduced in advance from the scavenging ports 31a and 32a into the combustion actuating chamber 15 is formed at an interface between the waste combustion gas "E" and the air-fuel mixture "M" that has been introduced later from the scavenging ports 31a and 32a into the combustion actuating chamber 15. Due to the existence of this air layer, the air-fuel mixture "M" is effectively prevented from being mixed with the waste combustion gas "E", thereby realizing almost a complete stratified scavenging. As a result, the quantity of so-called blow-by or the quantity of air-fuel mixture "M" to be discharged without being utilized for the combustion can be reduced to as minimum as possible, thus making it possible to reliably and completely ignite the air-fuel mixture "M", to improve the fuel consumption and to reduce the content of poisonous components in the exhaust gas.

Further, according to the two-stroke internal combustion engine 1 of this embodiment, an air inlet passageway 50 is disposed inside the wall portion 10A of the cylinder body 10. Therefore, by contrast to the conventional internal combustion engine where bifurcated air inlet passageways are required to be separately installed outside the engine body (cylinder body and crankcase), it becomes possible according to this embodiment to reasonably and compactly arrange the peripheral components of engine, thereby making it possible to reduce the number of parts, to lighten the weight thereof, to save the manufacturing cost thereof, and to simplify the working and assembling thereof.

In this case, when a pair of the right and left branch passageways 52 constituting a main portion of the air inlet passageway 50 are made linear in configuration, these branch passageways 52 can be formed by means of not only draw-molding but also drilling work. Additionally, the scavenging passageways 31 and 32 can be formed in an open state on the outer peripheral wall so as to be covered by the cap member 60, thereby making it possible to greatly improving the productivity.

Further, since the air inlet passageway 50 is formed inside the wall portion 10A of cylinder 10, the effective length of the air inlet passageway 50 can be shortened as compared with the conventional air inlet passageway, and hence it is expected that the performance of engine such as response characteristic can be improved.

Moreover, since the feeding of air is performed using not the external pump but a piston pumping, the entire structure of engine can be simplified and the manufacturing cost thereof can be cut down.

Figure 5:
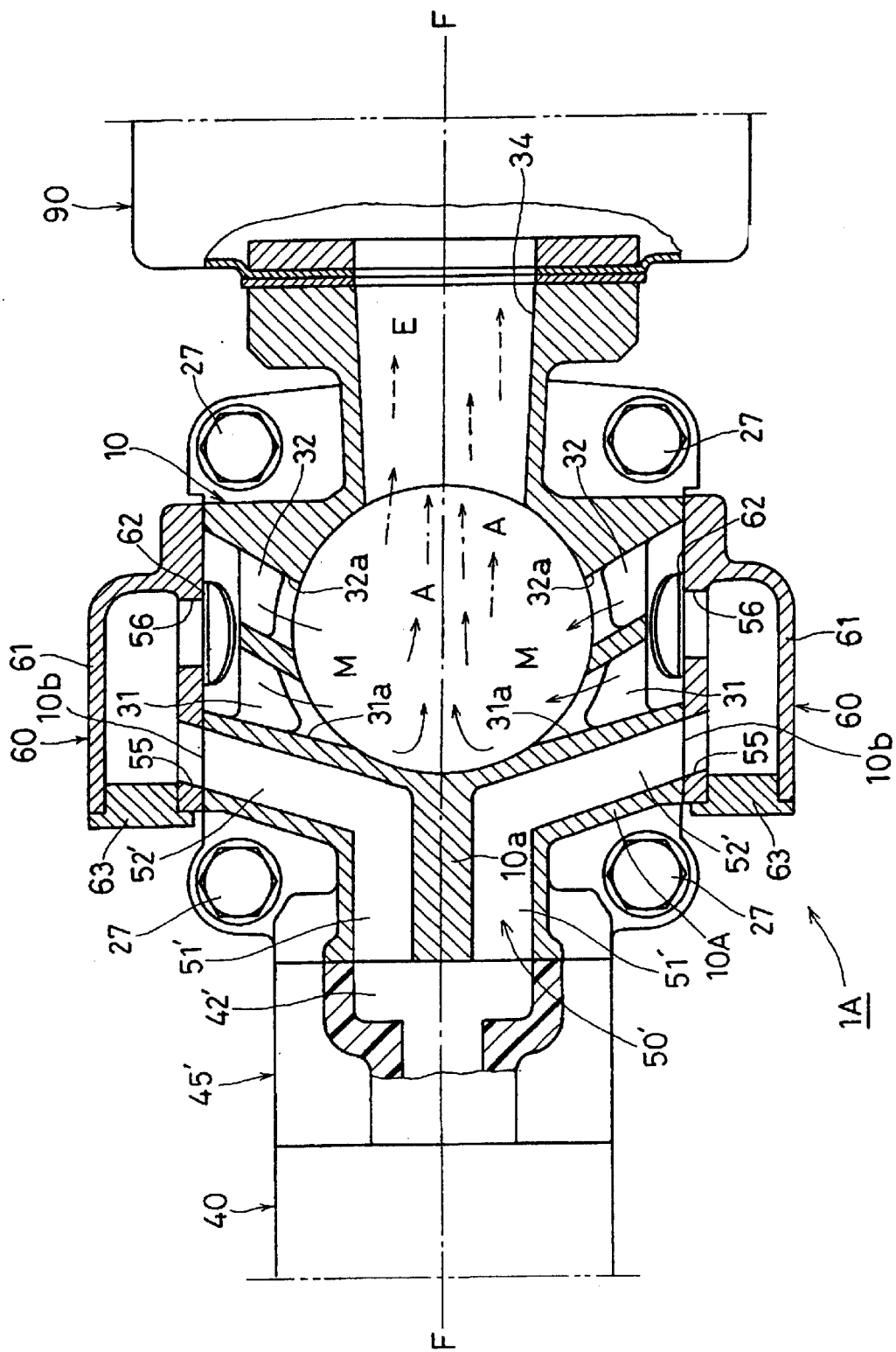
FIG. 5 is a cross-sectional view, similar to FIG. 4, of second embodiment of the present invention, wherein a modified example of the air inlet passageway is illustrated.

FIG. 5 shows a modified example of the air inlet passageway 50 of the above embodiment, and corresponds in structure to the embodiment shown in FIG. 4. The air inlet passageway 50' of this modified embodiment is partitioned via a barrier wall 10a into right and left sections in contrast to the air inlet port 51 of the first embodiment which is formed as a single unit (common to both right and left). In this case, a pair of right and left air inlet ports 51' are communicated with linear passageways 52', respectively. According to this embodiment, the flow rate and speed of air flow to these right and left linear passageways 52' can be optionally selected as required.

Figure 6:
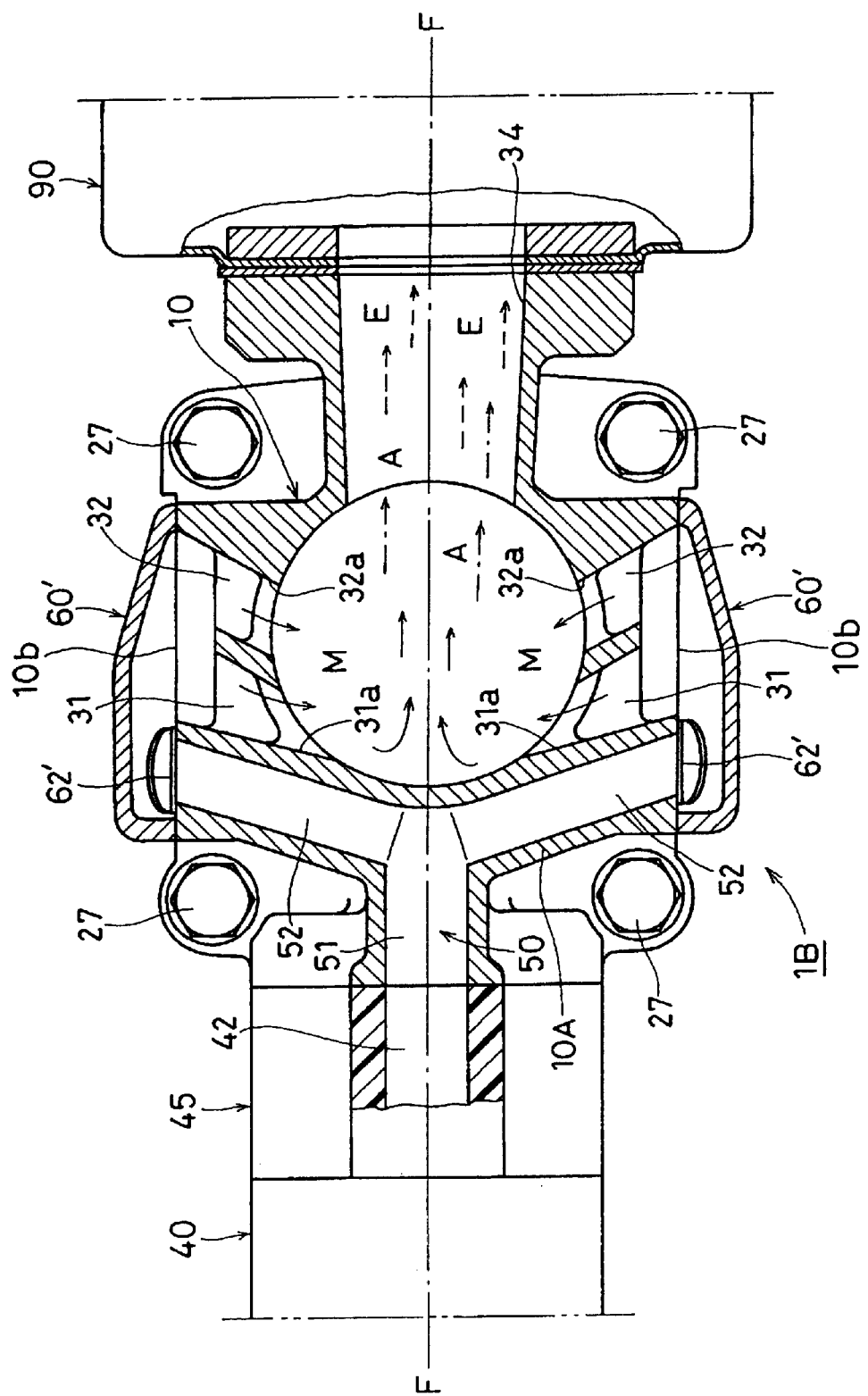
FIG. 6 is a cross-sectional view, similar to FIG. 4, of a third embodiment of the present invention, wherein a modified example of the cap member is illustrated.

FIG. 6 shows a modified example of the cap member 60 of the previous embodiment, and illustrates a cross-sectional view corresponding to FIG. 4. This modified cap member 60' has a tray-like cross-sectional configuration where one side thereof facing the scavenging ports 31a and 32a is opened (the longitudinal cross-section is 9-shaped as in the case of the previous embodiment), and a stopper-built-in reed valve 62' having the same structure as the pervious embodiment is attached to a portion of the cap member 60' which faces a downstream end of the branch passageways 52 in the flat portion 10b of the cylinder body 10, in contrast to the cap member 60 of the first embodiment wherein the cross-section thereof is U-shaped so as to form the air inlet port 55 and the air outlet port 56 and is provided with the air reed valve 62.

According to this embodiment, the configuration of the cap member 60' can be simplified, thus making it possible to eliminate the blind cap member 63 and also the core in the molding thereof. At the same time, it becomes possible to reduce the size and to lighten the weight thereof, thus making it possible to reduce the cost thereof.

Figure 7:
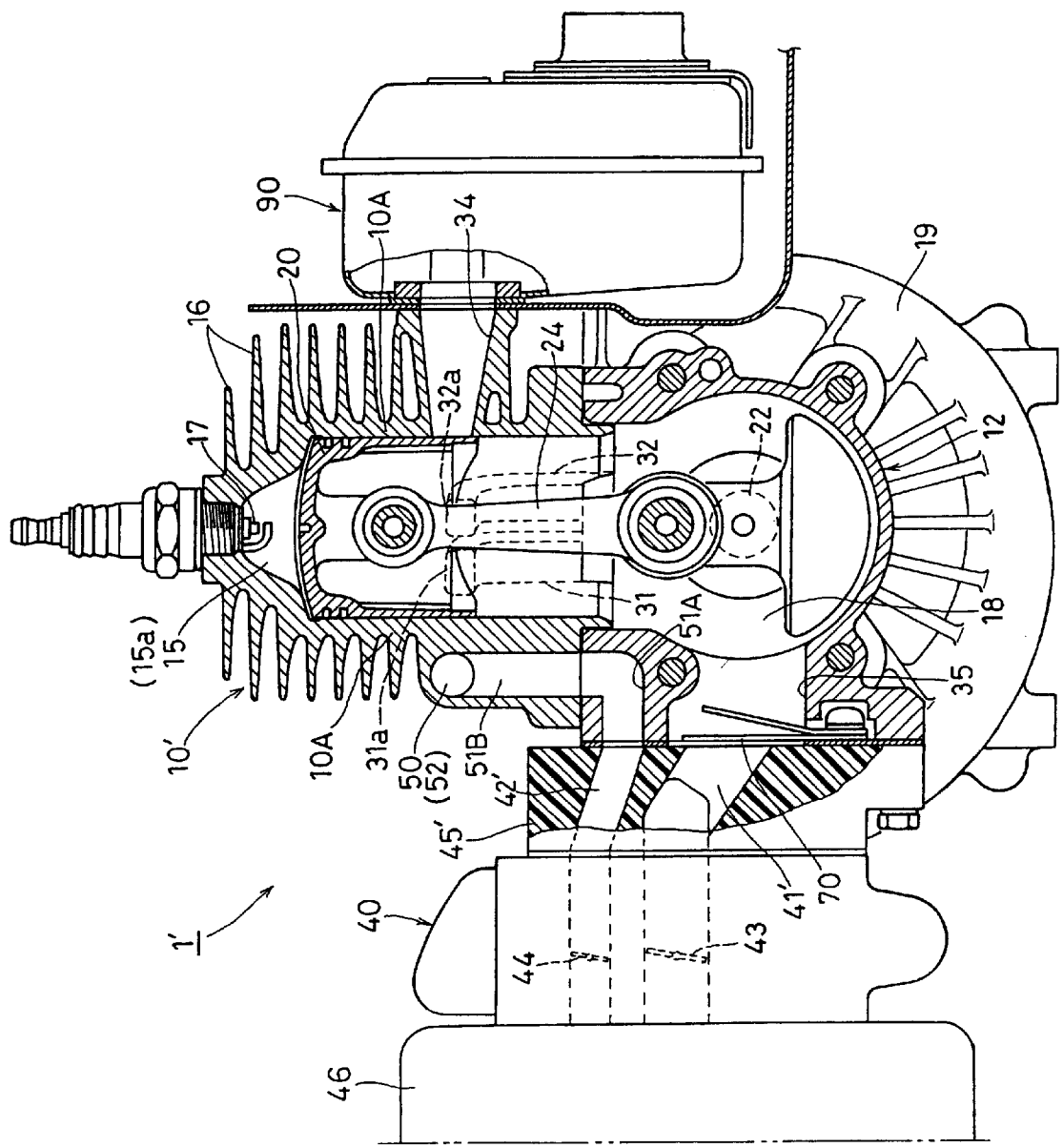
FIG. 7 is a longitudinal sectional view, similar to FIG. 1, illustrating a fourth embodiment of the present invention.

FIG. 7 shows another embodiment of the two-stroke internal combustion engine according to the present invention, illustrating a longitudinal cross-section corresponding to FIG. 1. In the two-stroke internal combustion engine 1' of this embodiment, the crankcase 12 is provided with a fore stage 51A of air inlet port and with the air-fuel mixture inlet port 35 to be opened or closed by a stopper-built-in air-fuel reed valve 70. Therefore, the air introduced from the air feeding passageway 42' is permitted to be introduced from the fore stage 51A of air inlet port into the branch passageways 52 through a hole-like rear stage 51B of air inlet port that has been disposed below the wall portion 10A of the cylinder body 10, and at the same time, the air-fuel mixture "M" to be fed from the air-fuel mixture feeding passageway 41' is permitted to be introduced into the crank chamber 18 through the air-fuel mixture reed valve 70 and the air-fuel mixture inlet port 35.

It is possible, with the two-stroke internal combustion engine 1' of this embodiment, to obtain almost the same effects as obtained in the previous embodiments, and to enhance the performance of engine. Additionally, the cap may be no longer required for the cylinder scavenging port, thus making it possible to minimize the number of parts and to reduce the manufacturing cost.

While in the foregoing someone embodiments of the present invention has been explained in details for the purpose of illustration, it will be understood that the construction of the device can be varied without departing from the spirit and scope of the invention.

As seen from the above explanation, it is possible, according to the present invention, to reduce as minimum as possible the quantity of so-called blow-by or the quantity of air-fuel mixture to be discharged without being utilized for the combustion, thus making it possible to improve the fuel consumption and to reduce the content of poisonous components in the exhaust gas. Additionally, since the air inlet passageway is disposed inside the wall portion of cylinder, it is possible to provide an air-preintroduction type two-stroke internal combustion engine which is capable of reasonably and compactly arranging the peripheral components of engine, thereby making it possible to reduce the number of parts, to lighten the weight thereof, to save the manufacturing cost thereof, and to simplify the working and assembling thereof.

What is claimed is:

1. A two-stroke internal combustion engine comprising:
 a cylinder body defining a combustion actuating chamber, an exhaust port provided in a wall portion of said cylinder body in communication with said combustion actuating chamber, and an air inlet passageway provided inside said wall portion of said cylinder body;
 a piston fittingly inserted in said combusting actuating chamber;
 a crankcase disposed below said cylinder body and defining a crank chamber; and
 means for forming an air-fuel mixture;
 wherein a pair of Schnürle-type scavenging passages is defined within said cylinder body and said crankcase, the scavenging passages allowing said combustion actuating chamber disposed above said piston to be communicated with said air inlet passageway and said crank chamber, the scavenging passages thereby allowing air to be introduced into said pair of scavenging passages from said air inlet passageway, and the air-fuel mixture forming means allowing said air-fuel mixture to be introduced into said combustion actuating chamber from said crank chamber via a pair of scavenging ports;
 wherein, during a descending stroke of said piston, said exhaust port is first opened before one of said pair of scavenging ports is opened, thereby enabling air to be introduced into said combustion actuation chamber via said pair of scavenging passages prior to introduction of said air-fuel mixture;
 wherein said air inlet passageway is constituted by an air inlet port, a pair of right and left branch passageways communicated with said air inlet port, and a communicating passageway which permits said pair of branch passageways to be communicated with said pair of scavenging passages;
 wherein an air-feeding passageway is defined for feeding external air to said air inlet passageway, and an air-fuel mixture-feeding passageway is defined for feeding, via an air-fuel mixture-inlet port, said air-fuel mixture generated by said air-fuel mixture generating means to said crank chamber, said air-feeding passageway and said air-fuel mixture-feeding passageway being arranged adjacently; and
 wherein said crankcase is provided with said air inlet port and said air-fuel mixture-inlet port.

2. The two-stroke internal combustion engine according to claim 1 wherein said pair of Schnürle scavenging passages are symmetrical with respect to a longitudinal section which divides said exhaust port.

3. The two-stroke internal combustion engine according to claim 1, which further comprises a cap member attached to said cylinder body which partially defines said communicating passageway.

4. The two-stroke internal combustion engine according to claim 3, which further comprises a check valve provided en in said air inlet passageway.

5. The two-stroke internal combustion engine according to claim 4, wherein said check valve is attached to said cap member.

6. The two-stroke internal combustion engine according to claim 4, wherein said check valve is attached to said pair of branch passageways.

7. The two-stroke internal combustion engine according to claim 1, wherein said air-fuel-generating means is a carburetor.

8. The two-stroke internal combustion engine according to claim 1 wherein said air-feeding passageway and said air-fuel mixture-feeding passageway are each provided with a throttle valve, said throttle valves being interlocked with each other.

9. A two-stroke internal combustion engine comprising:

a cylinder body defining a combustion actuating chamber, an exhaust port provided in a wall portion of said cylinder body in communication with said combustion actuating chamber, and an air inlet passageway provided inside said wall portion of said cylinder body;

a piston fittingly inserted in said combusting actuating chamber;

a crankcase disposed below said cylinder body and defining a crank chamber; and means for forming an air-fuel mixture;

wherein a pair of Schnürle-type scavenging passages is defined within said cylinder body and said crankcase, the scavenging passages allowing said combustion actuating chamber disposed above said piston to be communicated with said air inlet passageway and said crank chamber, the scavenging passages thereby allowing air to be introduced into said pair of scavenging passages from said air inlet passageway, and the air-fuel mixture forming means allowing said air-fuel mixture to be introduced into said combustion actuating chamber from said crank chamber via a pair of scavenging ports;

wherein, during a descending stroke of said piston, said exhaust port is first opened before one of said pair of scavenging ports is opened, thereby enabling air to be introduced into said combustion actuation chamber via said pair of scavenging passages prior to introduction of said air-fuel mixture;

wherein said air inlet passageway is constituted by an air inlet port, a pair of right and left branch passageways communicated with said air inlet port, and a communicating passageway which permits said pair of branch passageways to be communicated with said pair of scavenging passages;

a cap member attached to said cylinder body which partially defines said communicating passageway;

a check valve provided in said air inlet passageway;

wherein said check valve is attached to said pair of branch passageways.

10. The two-stroke internal combustion engine according to claim 9, wherein said pair of Schnürle-type scavenging passages are symmetrical with respect to a longitudinal section which divides said exhaust port.

11. The two-stroke internal combustion engine according to claim 9, wherein an air-feeding passageway is defined for feeding external air to said air inlet passageway, and an air-fuel mixture-feeding passageway is defined for feeding, via an air-fuel mixture-inlet port, said air-fuel mixture generated by said air-fuel mixture generating means to said crank chamber, said air-feeding passageway and said air-fuel mixture-feeding passageway being arranged adjacently.

12. The two-stroke internal combustion engine according to claim 11, wherein said air-fuel mixture-inlet port to be opened and closed is disposed below said air inlet port formed in said cylinder body.

13. The two-stroke internal combustion engine according to claim 11, wherein said crankcase is provided with said air inlet port and said air-fuel mixture-inlet port.

14. The two-stroke internal combustion engine according to claim 9, wherein said air-fuel-generating means is a carburetor.

15. The two-stroke internal combustion engine according to claim 9, wherein said air-feeding passageway and said air-fuel mixture-feeding passageway are each provided with a throttle valve, said throttle valves being interlocked with each other.

* * * * *